(12) United States Patent
Sawada et al.

(10) Patent No.: US 10,895,484 B2
(45) Date of Patent: Jan. 19, 2021

(54) GAS SUPPLY DEVICE CAPABLE OF MEASURING FLOW RATE, FLOWMETER, AND FLOW RATE MEASURING METHOD

(71) Applicant: FUJIKIN INCORPORATED, Osaka (JP)

(72) Inventors: Yohei Sawada, Osaka (JP); Nobukazu Ikeda, Osaka (JP); Kouji Nishino, Osaka (JP); Masaaki Nagase, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 255 days.

(21) Appl. No.: 16/069,126

(22) PCT Filed: Jan. 12, 2017

(86) PCT No.: PCT/JP2017/000762
§ 371 (c)(1),
(2) Date: Jul. 10, 2018

(87) PCT Pub. No.: WO2017/122714
PCT Pub. Date: Jul. 20, 2017

(65) Prior Publication Data
US 2019/0017855 A1 Jan. 17, 2019

(30) Foreign Application Priority Data
Jan. 15, 2016 (JP) .................. 2016-006622

(51) Int. Cl.
*G01F 3/38* (2006.01)
*G01F 15/04* (2006.01)
(Continued)

(52) U.S. Cl.
CPC .................. *G01F 3/38* (2013.01); *G01F 1/34* (2013.01); *G01F 1/50* (2013.01); *G01F 15/046* (2013.01);
(Continued)

(58) Field of Classification Search
CPC . G01F 1/50; G01F 3/38; G01F 15/046; G01F 25/00; G05D 7/0658
See application file for complete search history.

(56) References Cited

U.S. PATENT DOCUMENTS 7,474,968 B2  1/2009  Ding et al.
7,716,993 B2  5/2010  Ozawa et al.
(Continued)

FOREIGN PATENT DOCUMENTS

CN  101194215 A  6/2008
CN  101498600 A  8/2009
(Continued)

OTHER PUBLICATIONS

International Search Report issued in PCT/JP2017/000762; dated Feb. 7, 2017.

*Primary Examiner* — Daniel S Larkin
(74) *Attorney, Agent, or Firm* — Studebaker & Brackett PC

(57) ABSTRACT

A gas supply system capable of flow measurement includes a flow controller that controls the flow rate of a flowing gas, a first shutoff valve provided downstream of the flow controller, a second shutoff valve provided in a first flow passage communicating with the downstream side of the first shutoff valve, a second flow passage that branches from the first flow passage, a third shutoff valve provided in the second flow passage, a pressure sensing device that detects a pressure in a flow passage controlled by the first, second, and third shutoff valves, a temperature sensing device that
(Continued)

detects a temperature in the flow passage controlled by the first, second, and third shutoff valves, a volume measuring tank connected downstream of the third shutoff valve and having a known volume, and an arithmetic and control unit that obtains a passage volume controlled by the first, second, and third shutoff valves by applying Boyle's law to open and closed states of the third shutoff valve and calculates the flow rate of the flow controller, using the passage volume and detection values obtained by the pressure sensing device and the temperature sensing device.

10 Claims, 6 Drawing Sheets

(51) Int. Cl.
*G01F 1/34* (2006.01)
*G01F 25/00* (2006.01)
*G05D 7/06* (2006.01)
*G01F 1/50* (2006.01)
*G01F 17/00* (2006.01)
*G01F 22/02* (2006.01)

(52) U.S. Cl.
CPC ........... *G01F 25/00* (2013.01); *G05D 7/0658* (2013.01); *G01F 17/00* (2013.01); *G01F 22/02* (2013.01)

(56) References Cited

U.S. PATENT DOCUMENTS

| | | | |
|---|---|---|---|
| 2006/0011237 A1* | 1/2006 | Tison | G01F 25/0053 137/487.5 |
| 2006/0283254 A1 | 12/2006 | Ding et al. | |
| 2009/0019943 A1 | 1/2009 | Ozawa et al. | |
| 2009/0063059 A1* | 3/2009 | Nakada | G05D 7/0635 702/47 |
| 2009/0112491 A1* | 4/2009 | Nakada | G01F 25/0053 702/47 |
| 2009/0187356 A1 | 7/2009 | Artiuch | |
| 2013/0174635 A1* | 7/2013 | Yasuda | G05B 23/00 73/1.16 |
| 2014/0013838 A1* | 1/2014 | Sawada | G01F 1/34 73/203 |

FOREIGN PATENT DOCUMENTS

| | | |
|---|---|---|
| JP | 2009-543061 A | 12/2009 |
| JP | 4801726 B2 | 10/2011 |
| WO | 2007102319 A1 | 9/2007 |
| WO | 2008/014076 A2 | 1/2008 |

* cited by examiner

GAS SUPPLY DEVICE CAPABLE OF MEASURING FLOW RATE, FLOWMETER, AND FLOW RATE MEASURING METHOD

TECHNICAL FIELD

The present invention relates to a gas supply system capable of flow measurement, a flowmeter, and a flow measurement method.

BACKGROUND ART

Gas supply systems that include, for example, flow controllers and valves have conventionally been used in processes, such as semiconductor manufacturing, in order to supply gases, such as a process gas, at predetermined flow rates. The flow controllers of this type require highly accurate flow control, and therefore it is necessary to measure flow rates and verify control accuracy. As a method of flow measurement, the rate-of-rise (ROR) method (also referred to as a buildup method) of measuring flow rates by the rate of pressure rise (see Patent Literatures (PTLs) 1 and 2, for example) is widely known.

The ROR method involves passing gas with a flow rate controlled by a flow controller into a predetermined volume (V) interposed in a flow passage and measuring a rate of pressure rise ($\Delta P/\Delta t$) and a temperature (T) so as to measure a flow rate (Q) using the relation expressed by $Q=(\Delta P/\Delta t) \times V/RT$, where R is the gas constant.

CITATION LIST

Patent Literature

PTL 1: Japanese Translation of PCT Application No. 2009-543061
PTL 2: Japanese Patent No. 4801726

SUMMARY OF INVENTION

Technical Problem

The volume (V) in the flow passage necessary for flow measurement by the ROR method is not uniform due to factors, such as the layout of flow controllers, the number of flow controllers that are connected, and the piping layout. Thus, the volume (V) needs to be determined in advance of the flow measurement.

In the conventional ROR method, however, the volume (V) is measured using the flow controllers, and the measured volume (V) may include [[an]] errors because the flow rates, which are controlled by the flow controllers used for the volume measurement, include errors.

Although the gas supply systems require a space-saving design, the attachment of an auxiliary device for flow measurement hinders space saving.

In view of this, it is a primary object of the present invention to provide a gas supply system capable of flow measurement and a flow measurement method that are able to further reduce measurement errors in the volume necessary for flow measurement by ROR and to perform more accurate flow measurements of flow controllers.

Another object of the present invention is to provide a flowmeter for measuring a flow rate of a flow controller and with which it is possible to save space in the gas supply system.

Solution to Problem

In order to achieve the objects described above, a first aspect of the present invention relates to a gas supply system capable of flow measurement. The gas supply system includes a flow controller that controls a flow rate of a flowing gas, a first shutoff valve provided downstream of the flow controller, a second shutoff valve provided in a first flow passage communicating with a downstream side of the first shutoff valve, a second flow passage that branches from the first flow passage between the first shutoff valve and the second shutoff valve, a third shutoff valve provided in the second flow passage, a pressure sensing device for detecting a pressure in a flow passage controlled by the first shutoff valve, the second shutoff valve, and the third shutoff valve, a temperature sensing device for detecting a temperature in a flow passage controlled by the first shutoff valve, the second shutoff valve, and the third shutoff valve, a volume measuring tank connected downstream of the third shutoff valve and having a known volume, and an arithmetic and control unit. The arithmetic and control unit obtains a passage volume controlled by the first shutoff valve, the second shutoff valve, and the third shutoff valve by applying Boyle's law to open and closed states of the third shutoff valve, and calculates a flow rate of the flow controller by using the passage volume and detection values obtained by the pressure sensing device and the temperature sensing device.

According to a second aspect of the present invention, the gas supply system capable of flow measurement may further include a detachable fitting provided at a position upstream of the volume measuring tank in the second flow passage.

According to a third aspect of the present invention, the gas supply system may further include a fourth shutoff valve between the third shutoff valve and the volume measuring tank. The fitting may be provided between the third shutoff valve and the fourth shutoff valve.

According to a fourth aspect of the present invention, the arithmetic and control unit may be removably connected to the pressure sensing device and the temperature sensing device via an electric connector.

According to a fifth aspect of the present invention, the fitting may be provided at a position upstream of the pressure sensing device and the temperature sensing device in the second flow passage. The gas supply system may further include a fifth shutoff valve at a position upstream of the fitting in the second flow passage.

According to a sixth aspect of the present invention, the flow controller includes a plurality of flow controllers, the first shutoff valve is provided downstream of each of the flow controllers, and a downstream side of each of the first shutoff valves communicates with the first flow passage.

In order to achieve the objects described above, a seventh aspect of the present invention relates to a flowmeter for measuring a flow rate of a flow controller. The flowmeter is attachable to and detachable from a gas supply system. The gas supply system includes a flow controller that controls a flow rate of a flowing gas, a first shutoff valve provided downstream of the flow controller, a second shutoff valve provided in a first flow passage communicating with a downstream side of the first shutoff valve, a branch flow passage that branches from the first flow passage between the first shutoff valve and the second shutoff valve, and a fifth shutoff valve provided in the branch flow passage. The flowmeter includes a fitting that is attachable to and detachable from the branch flow passage on a downstream side of the fifth shutoff valve, a third shutoff valve provided in a continuous flow passage connected to the fitting, a pressure sensing device for detecting an internal pressure of the continuous flow passage, a temperature sensing device for detecting an internal temperature of the continuous flow passage, a volume measuring tank connected downstream of the third shutoff valve and having a known volume, and an arithmetic and control unit. The arithmetic and control unit obtains a passage volume by applying Boyle's law to open and closed states of the third shutoff valve, the passage volume being controlled by the first shutoff valve, the second shutoff valve, and the third shutoff valve with the fitting connected to the branch flow passage, and calculates a flow rate of the flow controller by using the passage volume and detection values obtained by the pressure sensing device and the temperature sensing device.

In order to achieve the objects described above, an eighth aspect of the present invention relates to a flow measurement method for measuring a passage volume with a volume measuring tank and measuring a flow rate of a flow controller by the ROR method using the passage volume, the passage volume being controlled by a first shutoff valve, a second shutoff valve, and a third shutoff valve, the first shutoff valve being connected downstream of the flow controller, the second shutoff valve being provided in a first flow passage communicating with a downstream side of the first shutoff valve, the third shutoff valve being provided in a flow passage that branches from the first flow passage between the first shutoff valve and the second shutoff valve, and the volume measuring tank being connected downstream of the third shutoff valve and having a known volume. The flow measurement method includes a first step of closing the first shutoff valve and opening the second shutoff valve and the third shutoff valve to exhaust a gas through the second shutoff valve, a second step of closing the second shutoff valve and the third shutoff valve, a third step of opening the first shutoff valve to pass a gas at a set flow rate through the flow controller, and then closing the first shutoff valve and detecting a first pressure in the first or second flow passage, a fourth step of opening the third shutoff valve and detecting a second pressure in a flow passage controlled by the first shutoff valve, the second shutoff valve, and the third shutoff valve, and a fifth step of calculating the passage volume controlled by the first shutoff valve, the second shutoff valve, and the third shutoff valve by Boyle's law using the first pressure, the second pressure, and the known volume for volume measurement.

According to a ninth aspect of the present invention, the flow measurement method may further include a sixth step of closing the first shutoff valve and the third shutoff valve and opening the second shutoff valve to exhaust a gas through the second shutoff valve, a seventh step of opening the first shutoff valve to pass a gas at a set flow rate through the flow controller, an eighth step of closing the second shutoff valve and detecting a third pressure in the flow passage controlled by the first shutoff valve, the second shutoff valve, and the third shutoff valve, a ninth step of measuring a temperature in the flow passage controlled by the first shutoff valve, the second shutoff valve, and the third shutoff valve, a tenth step of, after elapse of a predetermined time period from the eighth step, detecting a fourth pressure in the flow passage controlled by the first shutoff valve, the second shutoff valve, and the third shutoff valve, and an eleventh step of calculating a rate of pressure rise from the third pressure and the fourth pressure and calculating a flow rate of the flow controller by using the calculated rate of pressure rise, the passage volume measured in the fifth step, and the temperature measured in the ninth step.

According to a tenth aspect of the present invention, the flow controller includes a plurality of flow controllers arranged in parallel, a downstream side of each of the flow controllers communicates with the first flow passage, and a flow rate of a desired one of the flow controllers is measured.

Advantageous Effects of Invention

According to the present invention, a passage volume necessary for flow measurement is obtained by Boyle's law, and therefore the measured passage volume is not affected by errors of the flow controller. Also, in the case where the volume measuring tank is detachably connected via fittings to a flow passage that branches from the first flow passage, the volume measuring tank needs only be connected to the flow passage when measuring the passage volume, e.g., when installing the flow controller, and may be detached after the measurement of the passage volume. This achieves space saving. The volume measuring tank is also usable to measure the passage volume for ROR of other flow controllers, i.e., the volume measuring tank is reusable.

DESCRIPTION OF EMBODIMENTS

Figure 1:
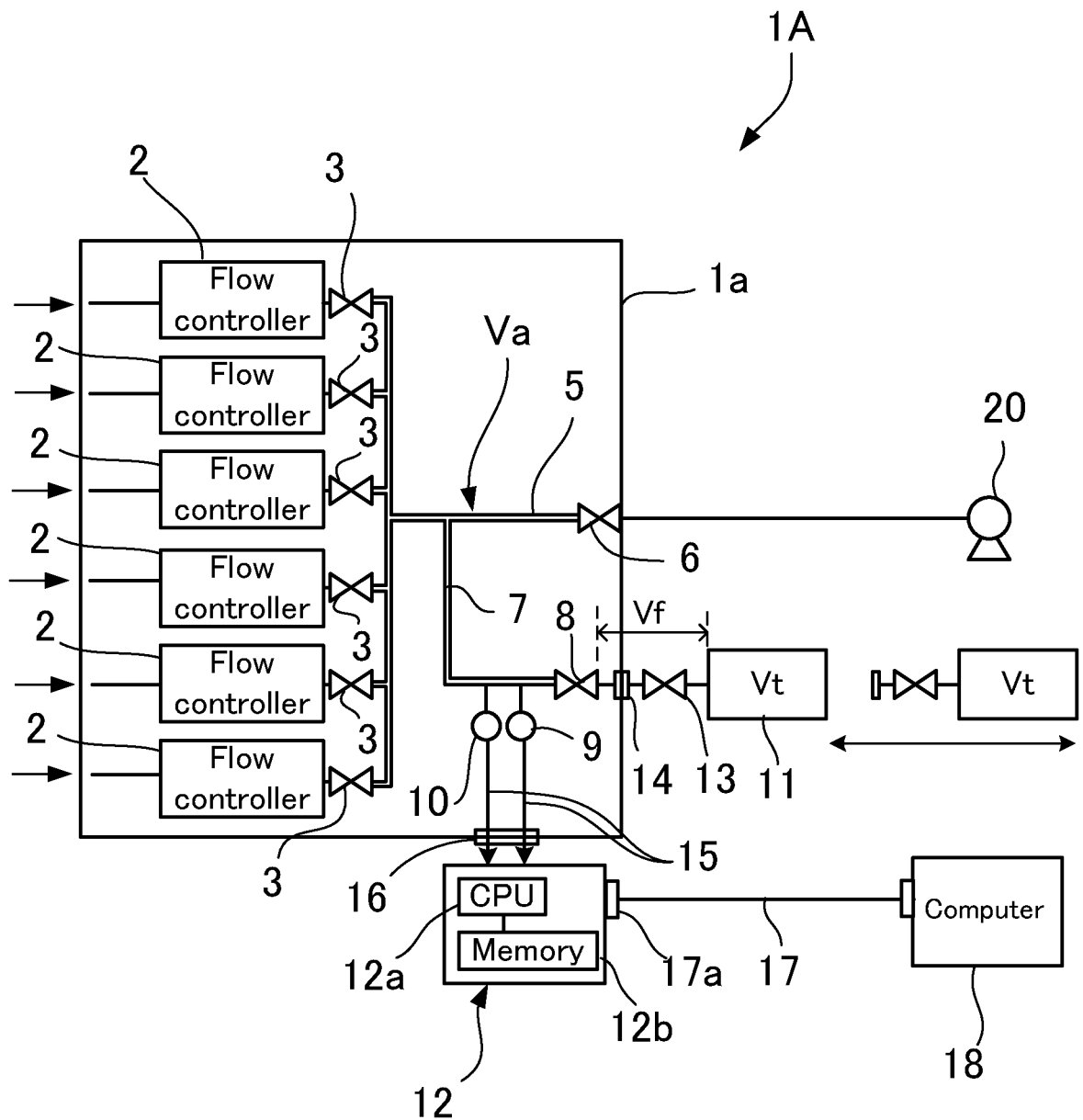
FIG. 1 is a block diagram illustrating Embodiment 1 of the present invention.

Embodiments of the present invention will be described hereinafter with reference to FIGS. 1 to 6. Note that constituent elements that are identical or similar are given the same reference numerals throughout the drawings.

FIG. 1 is a block diagram illustrating Embodiment 1 of the present invention. A gas supply system 1A capable of flow measurement includes a plurality of flow controllers 2 that control the flow rates of flowing gases, first shutoff valves 3 provided downstream of the flow controllers 2, a second shutoff valve 6 provided in a first flow passage 5 communicating with the downstream sides of the first shutoff valves, a second flow passage 7 that branches from the first flow passage 5 between the first shutoff valves 3 and the second shutoff valve 6, a third shutoff valve 8 provided in the second flow passage 7, a pressure sensing device 9 that detects a pressure in a flow passage controlled by the first shutoff valves 3, the second shutoff valve 6, and the third shutoff valve 8, a temperature sensing device 10 that detects a temperature in the second flow passage 7 that is upstream of the third shutoff valve 8 and controlled by the first shutoff valves 3, the second shutoff valve 6, and the third shutoff valve 8, a volume measuring tank 11 connected downstream of the third shutoff valve 8, a detachable fitting 14 provided at a position upstream of the volume measuring tank 11 in the second flow passage 7, and an arithmetic and control unit 12.

While the pressure sensing device 9 in FIG. 1 is provided in the second flow passage 7 upstream of the third shutoff valve 8, the pressure sensing device 9 may be disposed in the first flow passage 5 to detect the pressure of a gas in the first flow passage 5, because the pressure in the first flow passage 5 and the pressure in the second flow passage are substantially the same, although this configuration is not shown. Similarly, while the temperature sensing device 10 in FIG. 1 is provided in the second flow passage 7 upstream of the third shutoff valve 8, the temperature sensing device 10 may be disposed in the first flow passage 5 to detect the temperature of a gas in the first flow passage 5, because the temperature in the first flow passage 5 and the temperature in the second flow passage are substantially the same, although this configuration is not shown.

The arithmetic and control unit 12 obtains a passage volume Va controlled by the first shutoff valves 3, the second shutoff valve 6, and the third shutoff valve 8 (i.e., the volume of a portion indicated by the bold line in FIG. 1) by applying Boyle's law to the open and closed states of the third shutoff valve 8, and measures the flow rate of a flow controller 2, using the obtained passage volume Va and the detection values of the pressure sensing device 9 and the temperature sensing device 10.

The flow controllers 2 may be known flow controllers and may preferably be pressure-type flow controllers. Pressure control flow controllers control flow rates by controlling an upstream pressure P1 of a restriction part provided in a flow passage. The pressure control flow controllers utilize the fact that the flow rate of a fluid passing through the restriction part, such as an orifice, is proportional to only the upstream pressure P1 (absolute pressure) and does not depend on a downstream pressure P2 of the restriction part under a critical expansion condition. The critical expansion condition is the condition that a fluid passing through the restriction part flows at the speed of sound, and the upstream pressure P1 of the restriction part is approximately at least two times the downstream pressure P2 of the restriction part. The flow rate is controlled to a predetermined flow rate by detecting the upstream pressure P1 of the restriction part with the pressure sensing device and controlling a control valve disposed upstream of the restriction part with a built-in controller so as to let the upstream pressure P1 become a predetermined pressure. The control valve may be a piezo-electric-driven metallic diaphragm control valve.

The first shutoff valves 3, the second shutoff valve 6, and the third shutoff valve 8 may be pneumatically operated valves. Drive air is supplied via a solenoid valve (not shown) to each shutoff valve. The first shutoff valves 3 may be provided in the vicinity of gas outlets of the flow controllers 2. The second shutoff valve 6 is connected to a vacuum pump 20.

The pressure sensing device 9 may preferably be a known pressure sensor such as a semiconductor piezoresistive diffusion pressure sensor or an electrostatic capacitance pressure sensor. The temperature sensing device 10 may preferably be a known temperature sensor, such as a thermocouple.

The volume measuring tank 11 has a known volume. A manual fourth shutoff valve 13 is provided between the third shutoff valve 8 and the volume measuring tank 11. The detachable fitting 14 is connected between the third shutoff valve 8 and the fourth shutoff valve 13. As indicated by a virtual line in FIG. 1, the volume measuring tank 11 is detachable along with the fourth shutoff valve 13 by separating and removing the fitting 14. Prior to removing the fitting 14, the third shutoff valve 8 and the fourth shutoff valve 13 are closed in order to prevent the entry of outside air and dirt.

The arithmetic and control unit 12 houses an electric circuit board configured by components, such as a CPU 12a and a memory 12b, in a box and is detachably connected by wiring 15 to the pressure sensing device 9 and the temperature sensing device 10 via an electric connector 16. The electric connector 16 is attachable to a cover case 1a that houses the flow controllers 2 and other components. The arithmetic and control unit 12 is provided with a connection port 17a for connecting a communication cable 17, such as RS-232C cable, and is connectable to an external computer 18 by the communication cable 17. The external computer 18 may be a computer that controls semiconductor manufacturing equipment, such as a film deposition device. The arithmetic and control unit 12 is capable of controlling the solenoid valve (not shown) that turns on or off the drive air for operating the first shutoff valves 3, the second shutoff valve 6, and the third shutoff valve 8, either directly or via the computer 18 connected by the communication cable 17.

Figure 2:
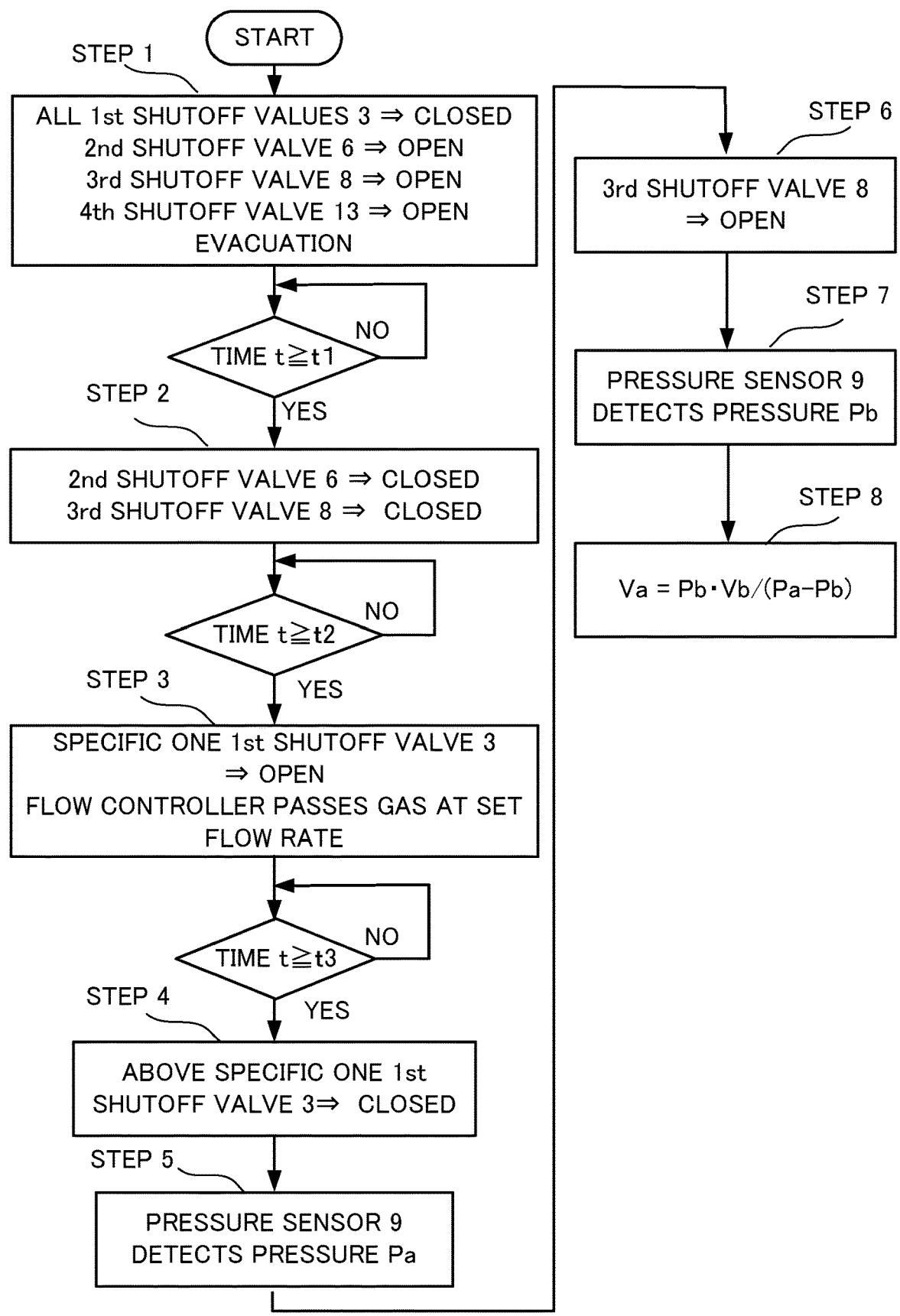
FIG. 2 is a flowchart illustrating an exemplary procedure for measuring a flow rate volume Va for verification in a flow measurement method according to the present invention.

The arithmetic and control unit 12 measures the passage volume Va indicated by the bold line in FIG. 1 in accordance with a program stored in the memory 12b through the procedure illustrated in FIG. 2. As shown in the flowchart in FIG. 2, in STEP 1, the system is evacuated with all of the first shutoff valves 3 closed and the second shutoff valve 6, the third shutoff valve 8, and the fourth shutoff valve 13 open. Then, it is determined whether TIME t has passed the predetermined time t1. After a predetermined time period t1 has elapsed, the second shutoff valve 6 and the third shutoff valve 8 are closed in STEP 2. Then, it is determined whether TIME t has passed the predetermined time t2. After a predetermined time period t2 has elapsed, one of the first shutoff valves 3 is opened to pass a gas (e.g., nitrogen gas) from the flow controller 2 in STEP 3. Then, it is determined whether TIME t has passed the predetermined time t3. After a predetermined time period t3 has elapsed, the first shutoff valve 3 for the flow controller 2 that is passing the gas is closed in STEP 4, at the point at which the pressure in the passage volume Va has risen. In STEP 5, the pressure sensing device 9 detects a pressure Pa. The detected pressure Pa is stored in the memory 12b. Next, in STEP 6, the third shutoff valve 8 is opened to diffuse the gas existing in the passage volume Va throughout the volume measuring tank 11. In STEP 7, the pressure sensing device 9 detects a pressure Pb. The detected pressure Pb is stored in the memory 12b. The volume Vt of the volume measuring tank 11 is known, and a volume Vf in the flow passage from the third shutoff valve 8 to the volume measuring tank 11 is also known. Assume that Vt+Vf=Vb. Here, Boyle's law (PV=constant) is applied.

$$Pa \cdot Va = Pb \cdot (Va + Vb) \quad (1)$$

$$\Leftrightarrow Va = Pb \cdot Vb / (Pa - Pb) \quad (2)$$

Using Equation (2) above, the passage volume Va is calculated and stored in the memory 12b (STEP 8).

After the passage volume Va is stored in the memory 12b, the volume measuring tank 11 may be detached from the second flow passage 7 by separating the fitting 14.

As described above, the passage volume Va is calculated using Boyle's law and thus can be measured using a method that does not depend on a set flow rate Qs of the flow controller 2. Accordingly, the measured passage volume Va does not include individual differences and flow rate errors of the flow controllers 2. Boyle's law holds for ideal gases and can still hold for real gases in a low pressure range.

Figure 3:
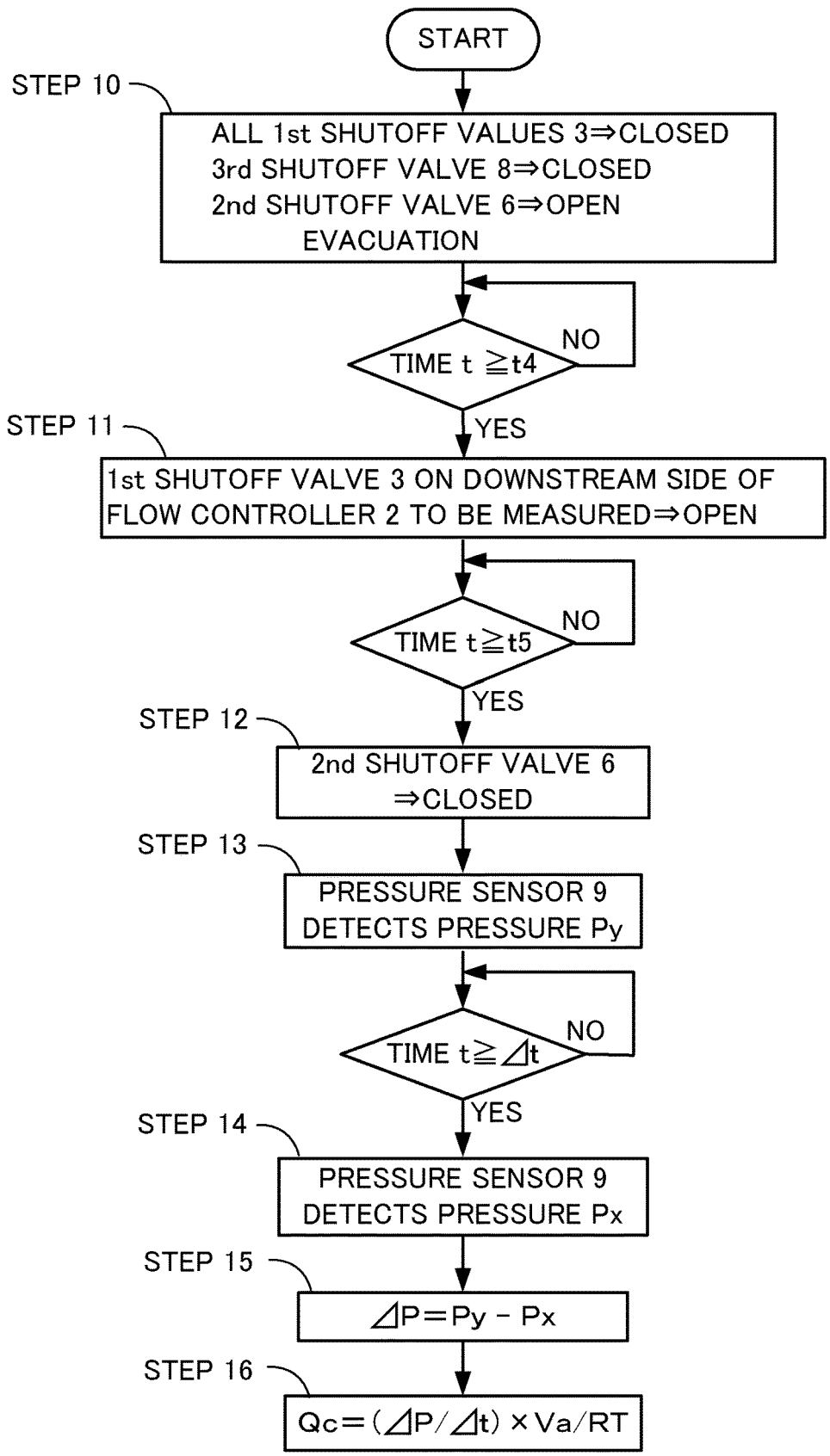
FIG. 3 is a flowchart illustrating an exemplary procedure for verifying a flow rate in the flow measurement method according to the present invention.

The arithmetic and control unit 12 calculates the flow rate of the flow controller 2 by ROR using the passage volume Va in accordance with a program stored in the memory 12b. Specifically, the arithmetic and control unit 12 calculates the flow rate in accordance with the flowchart illustrated in FIG. 3. As shown in FIG. 3, in STEP 10, the system is evacuated using the vacuum pump 20 with all of the first shutoff valves 3 and the third shutoff valve 8 closed and the second shutoff valve 6 open, so that the passage volume Va is exhausted. Then, it is determined whether TIME t has passed the predetermined time t4. After a predetermined time period t4 has elapsed, the first shutoff valve 3 for the one flow controllers 2 whose flow rate is to be measured is opened to pass a gas from this one flow controller 2 at the set flow rate Qs in STEP 11. Then, it is determined whether TIME t has passed the predetermined time t5. After a predetermined time period t5 has elapsed and the flow of the gas is stabilized, the second shutoff valve 6 is closed in STEP 12. As a result, the pressure in the passage volume Va rises. Then, the second shutoff valve 6 is closed, and in STEP 13, the pressure sensing device 9 measures a pressure Py and the temperature sensing device 10 measures a temperature T. After a predetermined time period Δt has elapsed, the pressure sensing device 9 detects a pressure Px in STEP 14. The time period Δt can be counted using a sampling period of the pressure sensing device 9. In STEP 15, Py−Px=ΔP is calculated. In STEP 16, a flow rate Qc is measured by applying the passage volume Va stored in the memory 12b and the temperature T measured by the temperature sensing device 10 to Equation (3) below, where R is the gas constant.

$$Qc = (\Delta P / \Delta t) \times Va / RT \quad (3)$$

Data as to the flow rate Qc measured as described above may be transmitted to the external computer 18, and the external computer 18 may verify the flow rate Qc through comparison with the set flow rate Qs of the flow controller 2.

As is clear from the above description, the passage volume Va is measured using Equation (2) above. This allows flow rates to be measured with higher accuracy than in a conventional method and without including individual differences and errors of the flow controllers 2.

The volume measuring tank 11 becomes unnecessary after the passage volume Va is measured and stored in the memory 12b, and therefore may be removed by disconnecting the fitting 14. Accordingly, space saving of the flow controllers 2, e.g., reducing the size of the cover case 1a that houses the flow controllers 2, is achieved, and costs are also reduced. The detached volume measuring tank 11 may be used to measure the passage volume Va at the time of measuring the flow rates of other gas supply systems.

Moreover, the arithmetic and control unit 12 may also be detached from the gas supply system 1A by disconnecting the electric connector 16 from the wiring 15 and removing the communication cable 17 connected to the external computer 18. This reduces the size of the gas supply system 1A and also reduces cost. The detached arithmetic and control unit 12 may be used to measure the volume Va at the time of measuring the flow rates of other gas supply systems.

Figure 4:
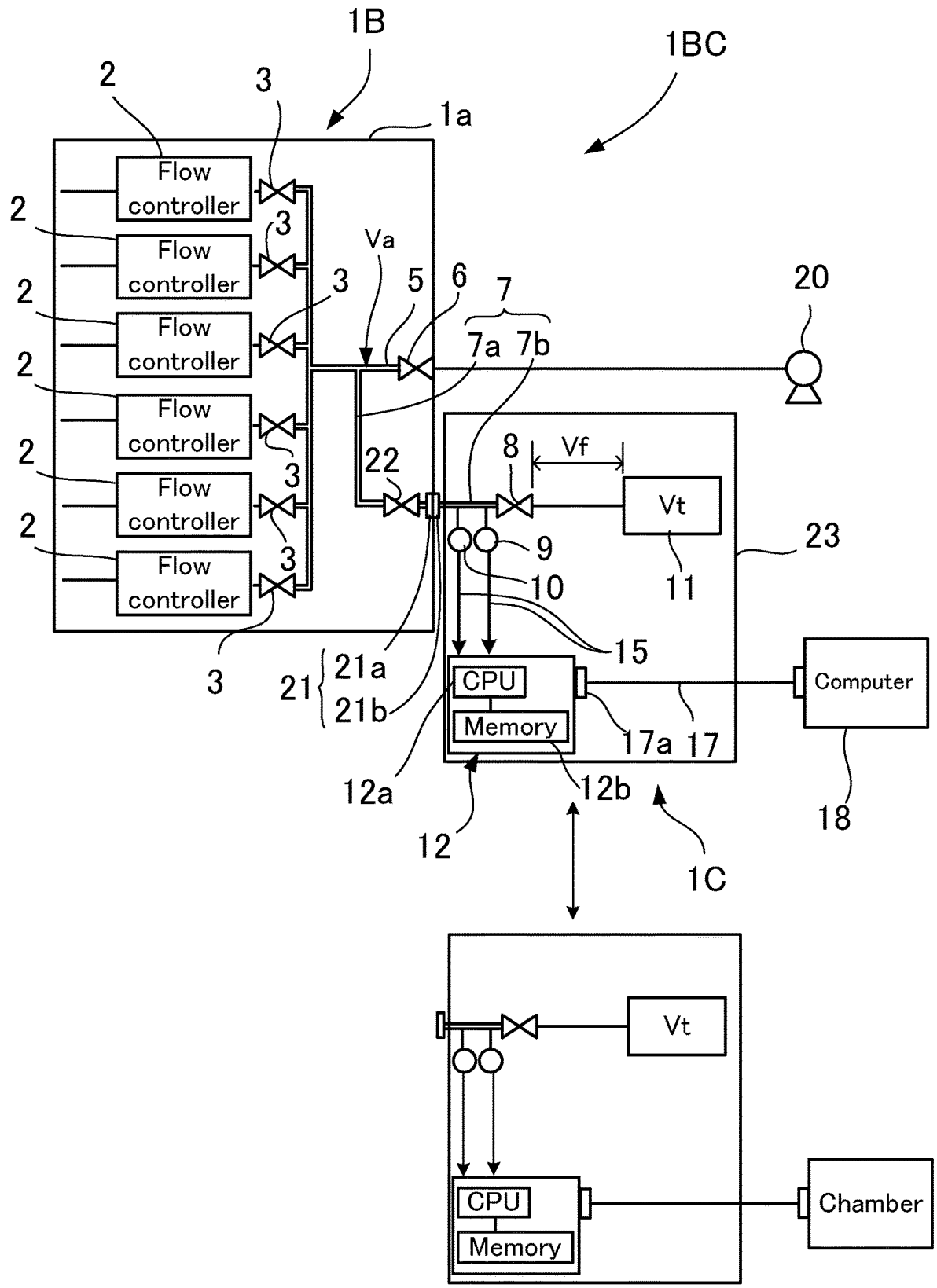
FIG. 4 is a block diagram illustrating Embodiment 2 of the present invention.

Next, Embodiment 2 of the present invention will be described hereinafter with reference to FIG. 4. Note that components that are similar to those of Embodiment 1 described above are given the same reference numerals. Embodiment 2 describes a flowmeter 1C that is attachable to and detachable from a gas supply system 1B.

The gas supply system 1B includes flow controllers 2 that control the flow rates of flowing gases, first shutoff valves 3 provided downstream of the flow controllers 2, a second shutoff valve 6 provided in a first flow passage 5 communicating with the downstream sides of the first shutoff valves 3, a branch flow passage 7a that branches from the first flow passage 5 between the first shutoff valves 3 and the second shutoff valve 6, and a fifth shutoff valve 22 provided in the branch flow passage 7a.

The flowmeter 1C includes a fitting 21b that is attachable to and detachable from a fitting 21a provided at the end of the branch flow passage 7a[[b]] on the downstream side of the fifth shutoff valve 22, a third shutoff valve 8 provided in a continuous flow passage 7b connected to the fitting 21b, a pressure sensing device 9 for detecting an internal pressure of the continuous flow passage 7b, a temperature sensing device 10 for detecting an internal temperature of the continuous flow passage 7b, a volume measuring tank 11 connected downstream of the third shutoff valve 8 and having a known volume, and an arithmetic and control unit 12.

By coupling the fittings 21a and 21b and connecting the branch flow passage 7a and the continuous flow passage 7b, a second flow passage 7 that branches from the first flow passage 5 is formed, and a gas supply system 1BC capable of flow measurement is configured.

According to the configuration described in Embodiment 2, the flowmeter 1C that includes the volume measuring tank 11, the pressure sensing device 9, the temperature sensing device 10, and the arithmetic and control unit 12 can be removed by simply separating and removing the fittings 21a and 21b. Also, the third shutoff valve 8, the volume measuring tank 11, the pressure sensing device 9, the temperature sensing device 10, and the arithmetic and control unit 12 are included in a single casing 23 and can be carried collectively. This configuration allows the third shutoff valve 8, the volume measuring tank 11, the pressure sensing device 9, the temperature sensing device 10, and the arithmetic and control unit 12 to be used for the flow measurement of flow controllers attached to other equipment, such as semiconductor manufacturing equipment.

Figure 5:
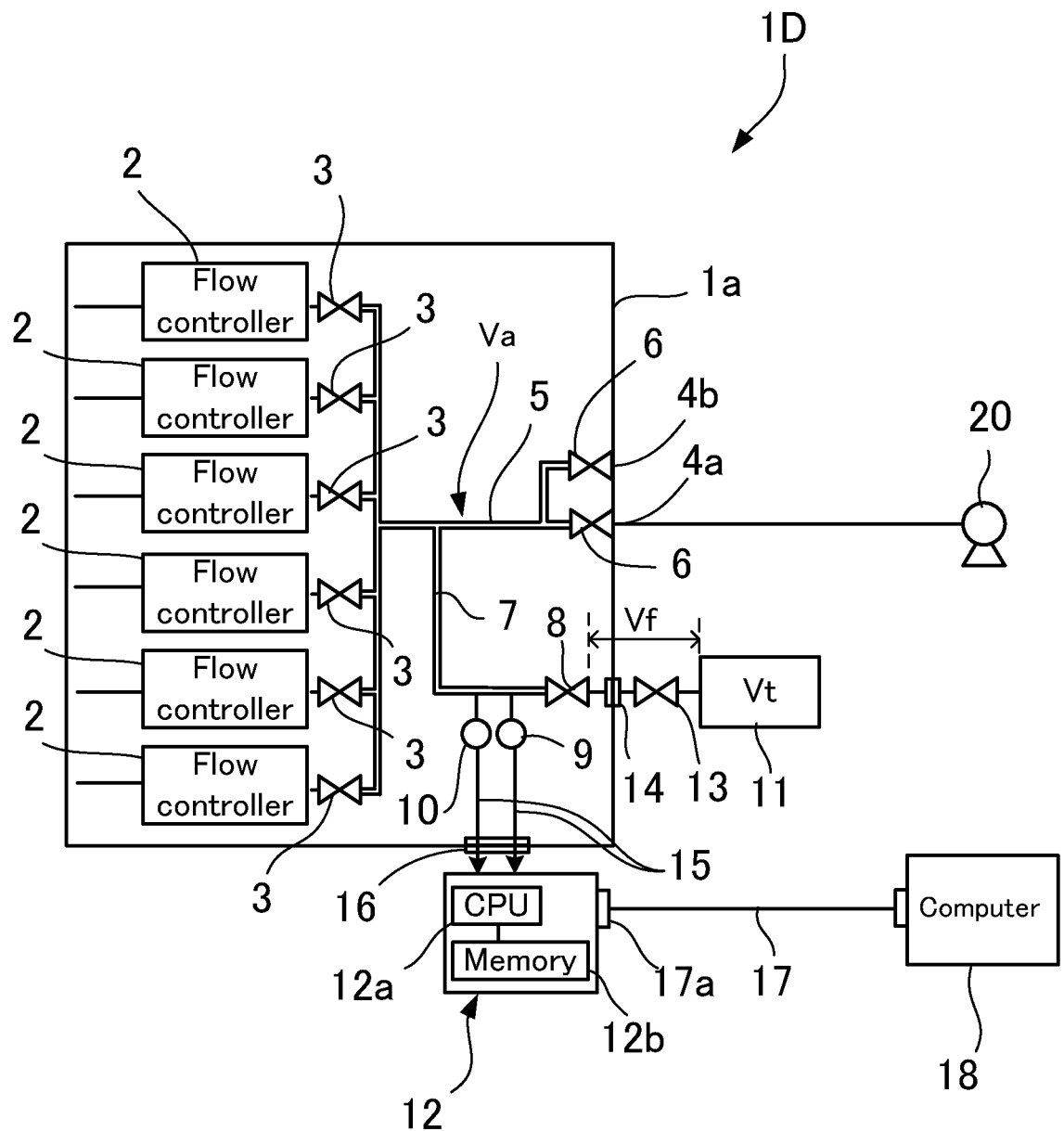
FIG. 5 is a block diagram illustrating Embodiment 3 of the present invention.

Next, Embodiment 3 according to the present invention will be described hereinafter with reference to FIG. 5. Note that components that are similar to those of Embodiment 1 described above are given the same reference numerals. A gas supply system 1D capable of flow measurement according to Embodiment 3 is configured such that a first flow passage 5 branches into two at the downstream end, one of the passages including a gas exhaust port 4a for process gases and the other passage including a gas exhaust port 4b for purge gases, and a first shutoff valve 6 is provided on the primary side of each of the gas exhaust ports 4a and 4b. The form of the first flow passage 5 may be modified in various ways, depending on the specification of equipment, such as semiconductor manufacturing equipment, in which the gas supply system is installed.

Figure 6:
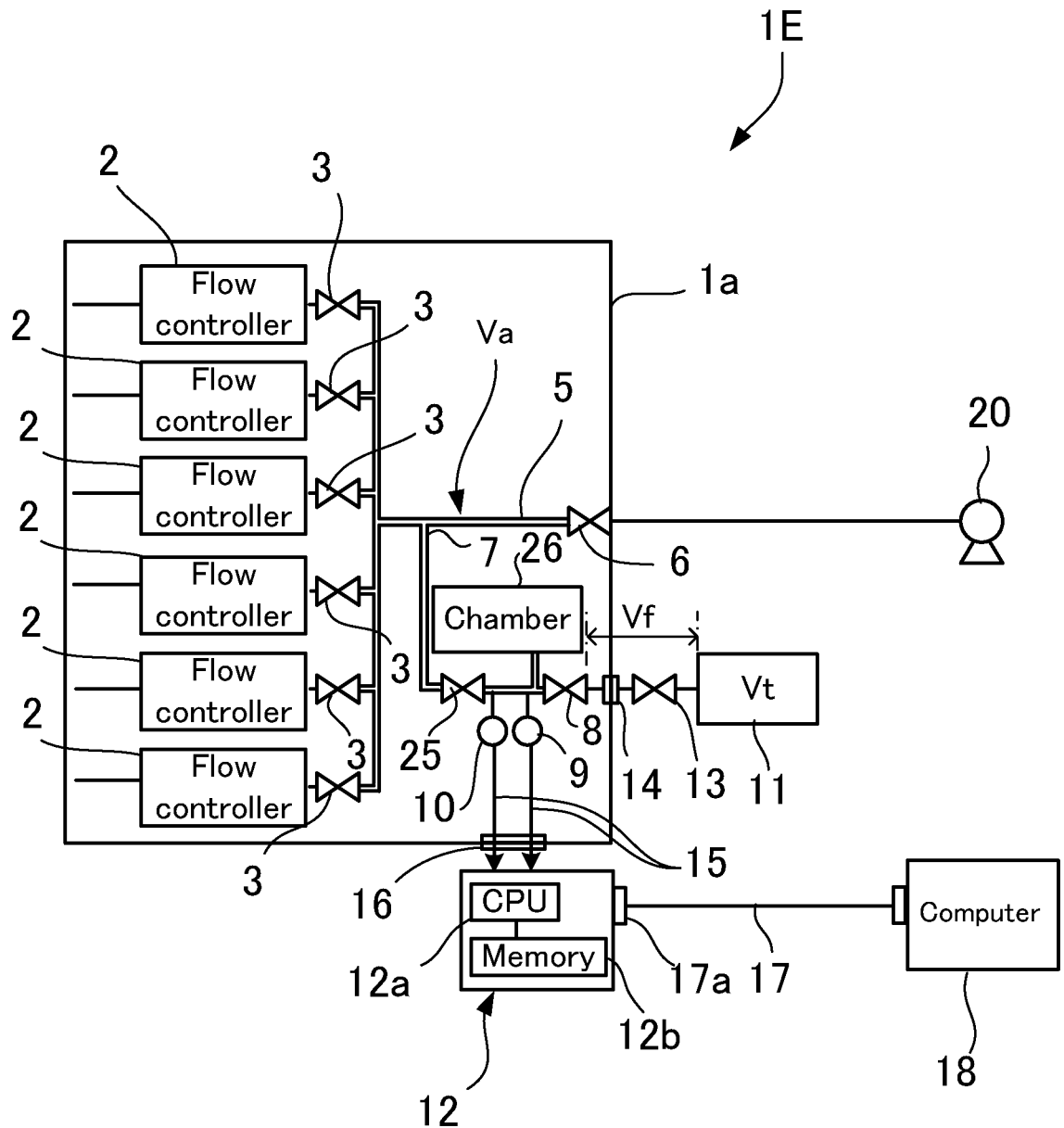
FIG. 6 is a block diagram illustrating Embodiment 4 of the present invention.

FIG. 6 is a block diagram illustrating Embodiment 4 as a variation of Embodiment 1. A gas supply system 1E capable of flow measurement according to Embodiment 4 is configured such that a fifth shutoff valve 25 is provided at a position upstream of the pressure sensing device 9 and the temperature sensing device 10 in a second flow passage 7, and a chamber 26 with a known capacity is additionally connected between the fifth shutoff valve 25 and a third shutoff valve 8. The ROR method may have low verification accuracy depending on the flow rate when the volume used to measure the rate of pressure rise is small, but a drop in the accuracy of flow measurement is prevented by providing the chamber 26.

The present invention is not limited to the embodiments described above and may be modified in various ways without departing from the spirit of the present invention. For example, although the above-described embodiments illustrate gas supply systems that include a plurality of flow controllers, the gas supply systems may include only one flow controller. Although the above-described embodiments illustrate pressure type flow control devices as flow controllers, thermal mass flow control devices may be used instead. Although the flowcharts in FIGS. 2 and 3 use an algorithm in which the procedure transitions to the next step after the elapse of the time periods t1 to t4, other algorithms may be used in which the procedure transitions to the next step depending on the pressure value detected by the pressure sensing device 9.

REFERENCE SIGNS LIST 1A, 1BC, 1D, 1E Gas supply system capable of flow measurement
1B Gas supply system
1C Flowmeter
2 Flow controller
3 First shutoff valve
4a, 4b Gas exhaust port
5 First flow passage
6 Second shutoff valve
7 Second flow passage
7a Branch flow passage
7b Continuous flow passage
8 Third shutoff valve
9 Pressure sensing device
10 Temperature sensing device
11 Volume measuring tank
12 Arithmetic and control unit
13 Fourth shutoff valve
14, 21 Fitting
16 Electric connector
22 Fifth shutoff valve
Va Passage volume

The invention claimed is:

1. A gas supply system capable of flow measurement, comprising:
a flow controller that controls a flow rate of a flowing gas;
a first shutoff valve provided downstream of the flow controller;
a second shutoff valve provided in a first flow passage communicating with a downstream side of the first shutoff valve;
a second flow passage that branches from the first flow passage between the first shutoff valve and the second shutoff valve;
a third shutoff valve provided in the second flow passage;
a pressure sensing device for detecting a pressure in a flow passage controlled by the first shutoff valve, the second shutoff valve, and the third shutoff valve;
a temperature sensing device for detecting a temperature in a flow passage controlled by the first shutoff valve, the second shutoff valve, and the third shutoff valve;
a volume measuring tank connected downstream of the third shutoff valve and having a known volume; and
an arithmetic and control unit,
wherein the arithmetic and control unit obtains a passage volume controlled by the first shutoff valve, the second shutoff valve, and the third shutoff valve by applying Boyle's law to open and closed states of the third shutoff valve, and calculates a flow rate of the flow controller by using the passage volume and detection values obtained by the pressure sensing device and the temperature sensing device.

2. The gas supply system capable of flow measurement according to claim 1, further comprising:
a detachable fitting provided at a position upstream of the volume measuring tank in the second flow passage.

3. The gas supply system capable of flow measurement according to claim 2, further comprising:
a fourth shutoff valve between the third shutoff valve and the volume measuring tank,
wherein the fitting is provided between the third shutoff valve and the fourth shutoff valve.

4. The gas supply system capable of flow measurement according to claim 2, wherein
the fitting is provided at a position upstream of the pressure sensing device and the temperature sensing device in the second flow passage,
the gas supply system further comprising:
a fourth shutoff valve at a position upstream of the fitting in the second flow passage.

5. The gas supply system capable of flow measurement according to claim 1, wherein
the arithmetic and control unit is removably connected to the pressure sensing device and the temperature sensing device via an electric connector.

6. The gas supply system capable of flow measurement according to claim 1, wherein
the flow controller includes a plurality of flow controllers,
the first shutoff valve is provided downstream of each of the flow controllers, and
a downstream side of each of the first shutoff valves communicates with the first flow passage.

7. A flowmeter for measuring a flow rate of a flow controller, the flowmeter being attachable to and detachable from a gas supply system, the gas supply system comprising: the flow controller that controls a flow rate of a flowing gas; a first shutoff valve provided downstream of the flow controller; a second shutoff valve provided in a first flow passage communicating with a downstream side of the first shutoff valve; a branch flow passage that branches from the first flow passage between the first shutoff valve and the second shutoff valve; and a fourth shutoff valve provided in the branch flow passage,
the flowmeter comprising:
a fitting that is attachable to and detachable from the branch flow passage on a downstream side of the fourth shutoff valve;
a third shutoff valve provided in a continuous flow passage connected to the fitting;
a pressure sensing device for detecting an internal pressure of the continuous flow passage;
a temperature sensing device for detecting an internal temperature of the continuous flow passage;
a volume measuring tank connected downstream of the third shutoff valve and having a known volume; and
an arithmetic and control unit,
wherein the arithmetic and control unit obtains a passage volume by applying Boyle's law to open and closed states of the third shutoff valve, the passage volume being controlled by the first shutoff valve, the second shutoff valve, and the third shutoff valve with the fitting connected to the branch flow passage, and calculates a flow rate of the flow controller by using the passage volume and detection values obtained by the pressure sensing device and the temperature sensing device.

8. A flow measurement method for measuring a passage volume with a volume measuring tank and measuring a flow rate of a flow controller by an rate-of-rise (ROR) method using the passage volume, the passage volume being controlled by a first shutoff valve, a second shutoff valve, and a third shutoff valve, the first shutoff valve being connected downstream of the flow controller, the second shutoff valve being provided in a first flow passage communicating with a downstream side of the first shutoff valve, the third shutoff valve being provided in a flow passage that branches from the first flow passage between the first shutoff valve and the second shutoff valve, and the volume measuring tank being connected downstream of the third shutoff valve and having a known volume, the flow measurement method comprising:
- a first step of closing the first shutoff valve and opening the second shutoff valve and the third shutoff valve to exhaust a gas through the second shutoff valve;
- a second step of closing the second shutoff valve and the third shutoff valve;
- a third step of opening the first shutoff valve to pass a gas at a set flow rate through the flow controller, and then closing the first shutoff valve and detecting a first pressure in the first or second flow passage;
- a fourth step of opening the third shutoff valve and detecting a second pressure in a flow passage controlled by the first shutoff valve, the second shutoff valve, and the third shutoff valve; and
- a fifth step of calculating the passage volume controlled by the first shutoff valve, the second shutoff valve, and the third shutoff valve by Boyle's law using the first pressure, the second pressure, and the known volume for volume measurement.

9. The flow measurement method according to claim 8, further comprising:
- a sixth step of closing the first shutoff valve and the third shutoff valve and opening the second shutoff valve to exhaust a gas through the second shutoff valve;
- a seventh step of opening the first shutoff valve to pass a gas at a set flow rate through the flow controller;
- an eighth step of closing the second shutoff valve and detecting a third pressure in the flow passage controlled by the first shutoff valve, the second shutoff valve, and the third shutoff valve;
- a ninth step of measuring a temperature in the flow passage controlled by the first shutoff valve, the second shutoff valve, and the third shutoff valve;
- a tenth step of, after elapse of a predetermined time period from the eighth step, detecting a fourth pressure in the flow passage controlled by the first shutoff valve, the second shutoff valve, and the third shutoff valve; and
- an eleventh step of calculating a rate of pressure rise from the third pressure and the fourth pressure and calculating a flow rate of the flow controller by using the calculated rate of pressure rise, the passage volume measured in the fifth step, and the temperature measured in the ninth step.

10. The flow measurement method according to claim 8, wherein
the flow controller includes a plurality of flow controllers arranged in parallel,
a downstream side of each of the flow controllers communicates with the first flow passage, and
a flow rate of a desired one of the flow controllers is measured.

* * * * *